United States Patent [19]

Cole

[11] Patent Number: 4,785,430
[45] Date of Patent: Nov. 15, 1988

[54] HYDRAULIC VIBRATOR WITH WIDE DYNAMIC RANGE

[75] Inventor: Jack H. Cole, Ponca City, Okla.
[73] Assignee: Conoco Inc., Ponca City, Okla.
[21] Appl. No.: 70,762
[22] Filed: Jul. 7, 1987
[51] Int. Cl.[4] .......................................... H04R 23/00
[52] U.S. Cl. ................................... 367/189; 181/119; 181/121
[58] Field of Search ................ 367/89, 190; 181/113, 181/114, 119, 121; 116/282, 284

[56] References Cited

U.S. PATENT DOCUMENTS

| | | | |
|---|---|---|---|
| 3,593,335 | 7/1971 | Wires et al. | 116/284 |
| 4,106,586 | 8/1978 | Stafford | 181/121 |
| 4,388,981 | 6/1983 | Fair | 181/119 |
| 4,450,928 | 5/1984 | Weber et al. | 181/121 |
| 4,641,725 | 2/1987 | Cole et al. | 181/119 |

Primary Examiner—Charles T. Jordan
Assistant Examiner—John W. Eldred
Attorney, Agent, or Firm—Ronald J. Carlson; Cortlan R. Schupbach; Frank J. Kowalski

[57] ABSTRACT

Vibrator apparatus having adjustable cylinder volume by means of a continuously adjustable end sleeve that varies the axial limit of the cylinder. A reaction mass with an axial cylinder bore reciprocates on a double rod piston. Frist and second end sleeves define the cylinder volume and one end sleeve is threaded and axially translatable relative to the piston to vary volume while a position sensing device continually maintains centering of the piston in the cylinder.

11 Claims, 2 Drawing Sheets

HYDRAULIC VIBRATOR WITH WIDE DYNAMIC RANGE

BACKGROUND OF THE INVENTION

1. Field of the Invention

The invention relates to hydraulic vibrators of the type that are adjustable as to optimum frequency range by adjustment of the volume of cylinder displacement and, more particularly, but not by way of limitation, it relates to an improved hydraulic vibrator with double rod end piston and reaction mass that includes structure to vary the internal cylinder volume in proportion to output frequency by varying the axial dimension of the cylinder chamber.

2. Description of the Prior Art

The prior art includes several different types of hydraulic vibrator wherein an attempt is made at controlled variation of cylinder volume in order to best utilize a mechanical vibrator at frequencies most in tune with its natural harmonics. U.S. Pat. No. 4,106,586 entitled "Hydraulic Vibrator" presents an early teaching wherein the hydraulic cylinder was varied in accordance with positioning of first and second end sleeves within the cylinder. In this case, the end sleeves were hydraulically movable between two positions by an ancillary hydraulic system. Following that, U.S. Pat. No. 4,388,981 was issued entitled "Variable Cylinder Hydraulic Vibrator and Control System" and this patent taught another hydraulic vibrator wherein the volume of the internal drive cylinder was varied by controlled positioning of opposite end sleeves; however, this teaching differed from the prior patent in that a continous or incremental adjustment was possible.

Another patent teaching is presented in U.S. Pat. No. 4,450,928 entitled "Dual Mode Seismic Source Vibrator" which automatically provides a shorter stroke for higher frequencies and longer stroke for lower frequencies by virtue of movable sleeves positioned within opposite ends of the drive cylinder. Here again, the sleeves are movable by application of fluid pressure in a manner similar to the previously discussed U.S. Pat. No. 4,388,981. Finally, U.S. Pat. No. 4,641,725 discloses a still further development wherein screw concepts are utilized to alter the effective lengths of the hydraulic cylinder chamber. The incremental variation of cylinder volume is achieved by synchronous rotation of threaded end sleeves that are disposed in opposite ends of the cylinder chamber. Several variations are disclosed but each requires synchronism of opposite end rotations.

SUMMARY OF THE INVENTION

The present invention relates to improvements in hydraulic vibrators having incrementally adjustable cylinder volumes thereby to achieve better frequency response characteristics, particularly at the relatively higher frequencies. The apparatus consists of a reaction mass defining an axial chamber and being reciprocally disposed on a double rod end piston. The axial chamber is formed into the hydraulic cylinder by means of a cylinder sleeve, a lower end sleeve, and an upper, adjustable end sleeve that is threadedly engaged in the axial bore and adapted for translation therethrough to vary the volume of the drive cylinder. The threaded upper end sleeve may be gear driven by a suitable drive motor, and rotational indication may be derived through a suitable encoder to provide output indication of the end sleeve position. For seismic usage, the hydraulic vibrator is suitable for any of compressional or shear wave applications.

Therefore, it is an object of the present invention to provide a hydraulic vibrator having wider bandwidth, particularly at the higher frequencies.

It is also an object of the invention to provide a hydraulic vibrator in which cylinder volume can be easily and reliably changed.

Also, it is an object of the invention to provide a seismic vibrator wherein cylinder displacement is easily varied to effect a corresponding variation in the vibration frequency range.

Finally, it is an object of the invention to provide a seismic vibrator that is more versatile in application and capable of inducing a greater amount of useable seismic response as seen by the energy receiving facility.

Other objects and advantages of the invention will be evident from the following detailed description when read in conjunction with the accompanying drawings which illustrate the invention.

DETAILED DESCRIPTION OF THE INVENTION

Hydraulic vibrators of the type used in seismographic surveying have gained wide acceptance in recent years and efforts are continuously under way to improve their performance. More recently, considerable attention has been given to increasing the band widths, particularly on the high frequency end of the band, in order to increase effectiveness and produce improved seismic data.

The low end of the hydraulic vibrator band width is usually designated as $f_L$ and is related to system parameters by the expression:

$$f_L = (19.559 F/RS)^{\frac{1}{2}} \tag{1}$$

where F equals the force peak, R equals reaction mass weight, and S is the useful peak-to-peak stroke.

The high end of the band width is sometimes referred to as the baseplate-fluid compressibility resonance, $f_H$, and this value is expressed by:

$$f_H = 3.127 (K_c/W)^{\frac{1}{2}}$$

$$\text{where } K_c = 2BA^2/V \text{ and} \tag{2}$$

where W equals the baseplate weight, A is equal to the piston area, B is equal to the fluid bulk modulus, and V is equal to the fluid volume trapped between the piston and servovalve.

Both $f_L$ and $f_H$ are substantially controlled by the fluid volume V, since weight W is initially made as low as practical, B is constant for a given fluid, and the piston area A is established by the peak force F desired and the operating hydraulic fluid pressure. It is also usually desirable to keep the reaction mass R as low in weight as permissible. Thus, and in accordance with existing constant cylinder vibrator design, the volume V is a fixed quantity as determined by the particular target frequency $f_L$ and $f_H$; however, by making the fluid volume quantity V variable, it is possible to increase $f_H$ selectively to an operationally preferred value.

Figure 1:
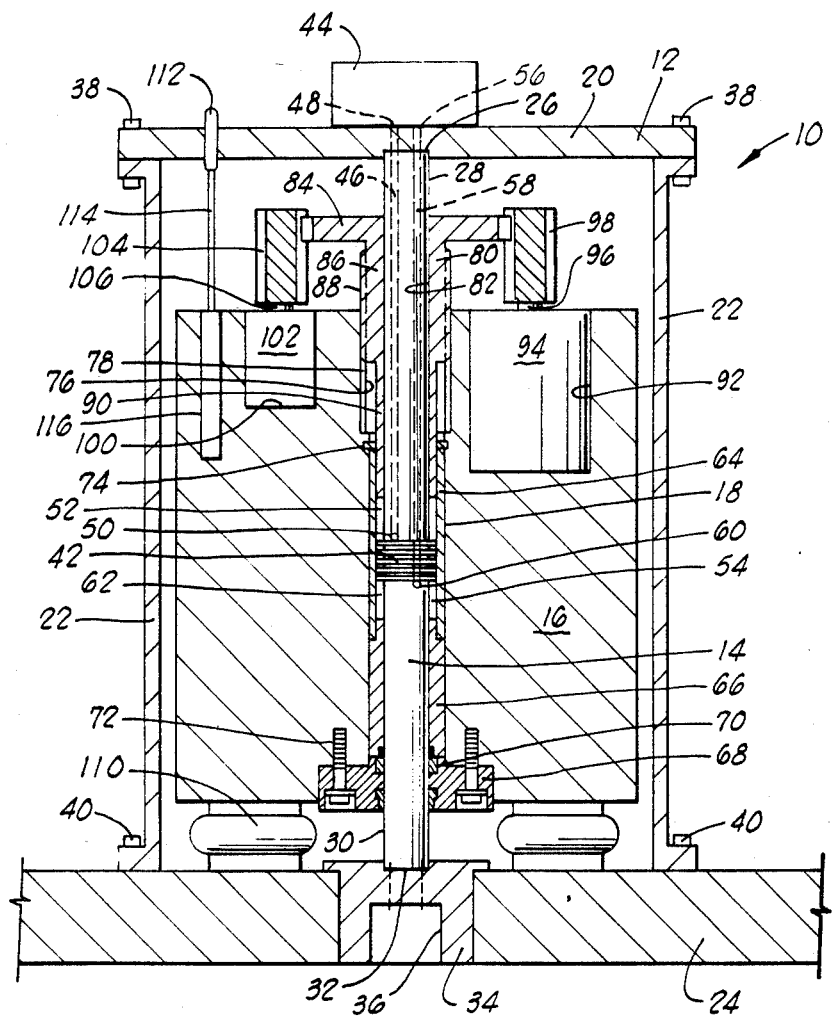
FIG. 1 is a view in vertical cross-section of a variable cylinder hydraulic vibrator constructed in accordance with the present invention.

Referring to FIG. 1, a variable cylinder hydraulic vibrator 10 consists of a rigid outer housing 12 securely positioning a generally central placed double rod piston 14 and having a reaction mass 16 with central bore 18 disposed reciprocally thereon. The support frame 12 may consist of such as a top plate 20 as secured to a peripheral housing member 22 which, in turn, is rigidly connected to a base plate 24. The housing 22 may be a continuous peripheral structure, normally cylindrical but not necessarily, or it may take more rudimentary form of a balance array of interconnecting struts. The baseplate 24 functions also for vibration energy coupling and may include additional structure such as cleat or spike attachements for earth coupling.

The top plate 20 includes a central seating bore 26 for firmly receiving the upper end of piston rod end 28. Suitable fasteners such as high strength bolts are used to attach top plate 20 to piston rod end 28. A lower end piston rod end 30 is received within a seating bore 32 of an end cap 34 that is securely retained within baseplate 24. Once again, selected fasteners (dash-lines) may be used to secure rod end 30 into end cap 34 and an access bore 36 is formed to aid assembly. Final assembly using a plurality of fasteners 38 between top plate 20 and housing 22 and fasteners 40 between housing 22 and base plate 24 secures the finished assembly.

The double end piston 14 having upper rod end 28 and lower rod end 30 is formed with a generally central piston 42 of conventional configuration with a plurality of grooves for ring seating. Hydraulic fluid delivery from a servovalve 44 mounted on a central portion of top plate 20 is through the upper rod end 28. Thus, porting shown by dashlines consists of a rod port 46 communicating between a first servovalve port 48 and a cylinder port 50 disposed in an upper chamber 52 of cylinder chamber 54. In like manner, a second port 56 of servovalve 48 communicates via a port 58 formed within rod end 28 and finding outlet at port 60 in lower chamber 62 of chamber 54.

A central cylinder sleeve 64 is disposed in concentric fit within bore 18 in surround of piston 42 and defining the cylinder chamber 54. A bottom sleeve 66 is positioned concentrically between lower rod end 30 and cylinder bore 18 and an annular end fitting 68 including conventional types of packing and sealing ring assembly 70 is secured by a plurality of fasteners 72 to rigidly secure the reaction mass 16 with bottom sleeve 66 secured adjacent cylinder sleeve 64. The upper end of cylinder sleeve 64 is retained by a snap ring 74 suitably seated in an annulus formed in cylinder bore 18.

The upper end of cylinder bore 18 is formed with a counter bore 76 having internal threads 78. A threaded sleeve assembly 80 having a bore 82 is then received over upper rod end 28. The assembly 80 is unitarily formed to include an upper driven ring gear 84, a threaded midportion 86 having threads 88 and a lower annular sleeve 90. The threads 88 may be rotated within threads 78 of counterbore 76 to provide controlled movement of adjustable sleeve assembly 80 in translation along upper rod end 28. In so doing, the lower annular sleeve 90 is moved in the annular space between cylinder sleeve 64 and upper rod end 28 thereby to vary the upper limit of upper cylinder chamber 52.

The reaction mass 16 includes a bore 92 formed to receive and retain a suitable drive motor 94; for example, a suitable form of pulse driven stepper motor selected for coaction with digital control procedures may be used. Alternatively, a Moog Type Brushless D-C Motor, Model 206 may be used and this unit includes a built-in optical encoder. An output shaft 96 of motor 94 then carries a drive gear 98 positioned in mesh contact with the ring gear 84 of assembly 80. Thus, rotation from motor 94 is effected to drive the adjustable sleeve assembly 80 up or down within the threads 78 of counterbore 76. It may be noted that drive gear 98 is elongated to allow for continued mesh contact as ring gear portion 84 moves up or down in relation to reaction mass 16. A bore 100 is also formed in the upper surface of reaction mass 16 to receive and retain a suitable encoder 102 which can provide an output signal indicative of threaded sleeve position. Thus, encoder 102 receives rotational input via gear 104 and drive shaft 106 to produce an electrical output indicative of mechanical position, as will be further described below. A suitable encoder is the Model 5V87BL available from BEI, Inc. of Little Rock, Ark.

A plurality of air bags 110 may be utilized to support the reaction mass 16 over the base plate 24. Such air bags 110 are well-known in the related art and assemblies of suitable size and rating may be arrayed, e.g. in quadrature, to provide floating support to the reaction mass near its neutral position. A suitable guide rod (not shown) of conventional type may be aligned between the reaction mass 16 and base plate 24 in order to prevent relative rotation therebetween. Finally, an LVDT (linear variable differential transformer) 112 may be secured in upper plate 20 to extend its sensing core 114 into a bore 116 formed within the upper surface of reaction mass 16. The LVDT is a well-known type of displacement sensing device as used in vibrators and it functions to sense relative displacement of the housing 22/baseplate 24 relative to the reaction mass 16. Output from LVDT 112 is fed back to the vibrator control system to maintain cylinder balance, as will be further described.

Figure 2:
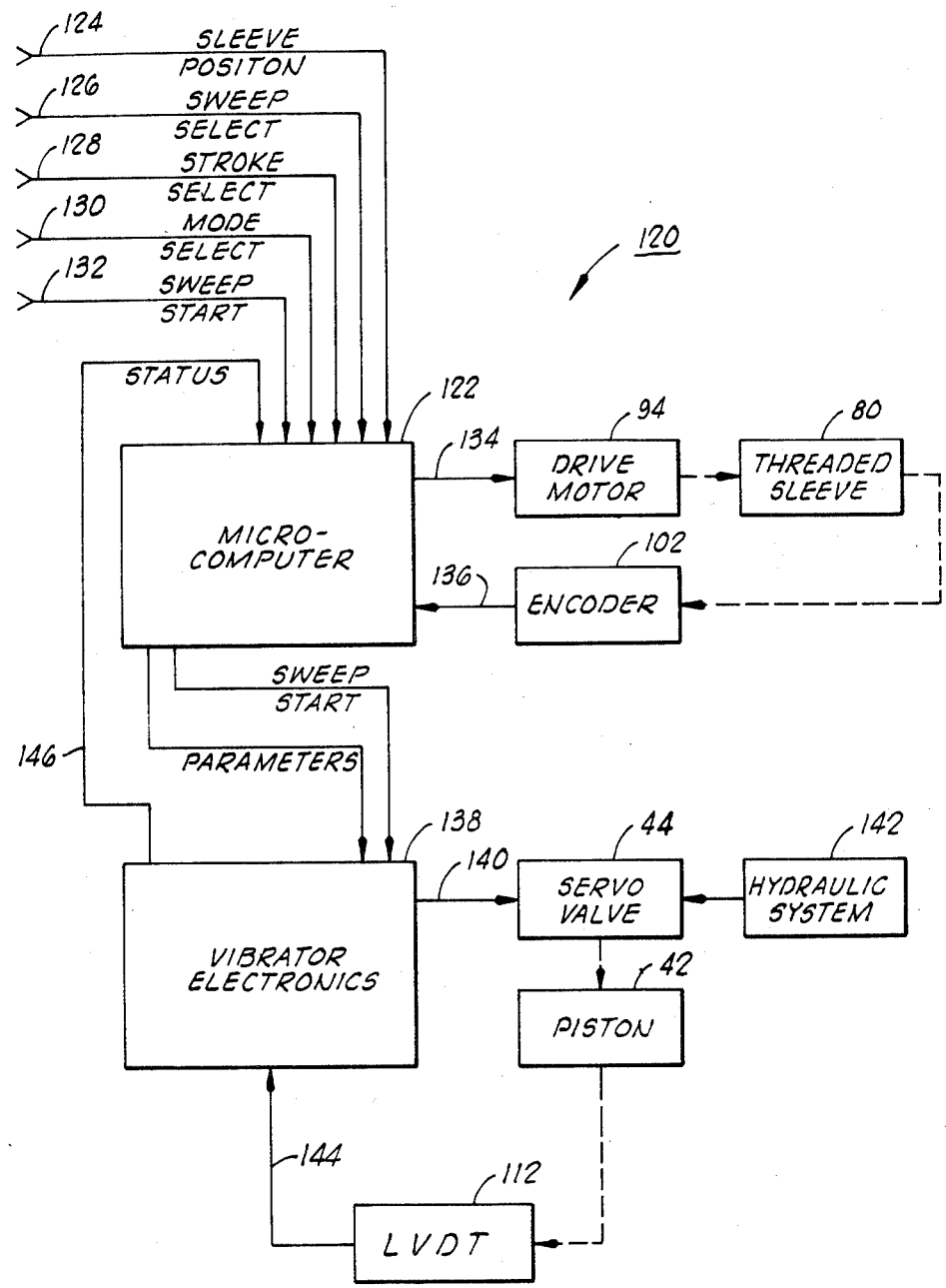
FIG. 2 is a block diagram of a drive control system as utilized with the variable cylinder vibrator of FIG. 1.

FIG. 2 illustrates one form of control system 120 that might be utilized with the variable cylinder seismic vibrator 10 of FIG. 1. Essentially, the control system would use a suitable microprocessor circuit with requisite storage members to function as a microcomputer 122 that maintains executive control over all functions of the seismic vibrator 10 during operation. Certain initial inputs such as sleeve position 124, sweep select 126, stroke select 128, mode select 130 and sweep start 132 may be input as by switch or keyboard (not shown). The microcomputer 122 would also contain program requisite for providing output on line 134 to drive motor 94 for rotation of threaded sleeve 80 which, in turn, would provide rotation of encoder 102 and feed back position input on line 136 to the microcomputer 122. The microcomputer 122 would also be programmed to generate selected values of the sweep start and operating parameters for input to the vibrator electronics 138.

The vibrator electronics 138 may be a commercially available type of control unit, e.g. a digital control system such as is commercially available from Pelton Company of Ponca City, Okla. Output from vibrator electronics 138 is applied via line 140 in conventional manner to control the servovalve 44 that is functioning in coaction with a hydraulic system 142. Thus, hydraulic pressure as applied via servovalve 44 controls reciprocation of piston 42 relative to reaction mass 16, and this movement is further sensed by LVDT 112 to provide an output control feedback via line 144 to the vibrator electronics 138. An output 146 from vibrator electronics 138 provides continuing status feedback for input to microcomputer 122.

In operation, the vibrator 10 functions through frequency upsweep or downsweep to vary the fluid volume V in the system by varying the volume of cylinder chamber 54. The cylinder chamber 54 is varied equally as to the volumes of upper chamber 52 and lower chamber 62, and this is achieved essentially by varying only one wall of the chamber 54 while continually sensing and recentering the piston 42 as controlled by microcomputer 122 and vibrator electronics 138. For example, in the case of a frequency upsweep the annular sleeve 90 is moved downward to reduce the volume of chamber 54 and, simultaneously, output signal from LVDT 112 senses position of reaction mass 16 for input to the vibrator electronics 138 which provides output control to servovalve 48 whereby reaction mass 16 and therefore chamber 54 is centered on piston 42.

As shown in FIG. 1, the threaded sleeve assembly 80 is in the upward or maximum fluid volume V position, as it would be at the beginning of a frequency upsweep operation. As the sweep frequency increases, the drive motor 94 rotates drive gear 98 which, in turn, rotates ring gear 84 to cause the threaded sleeve assembly 80 to translate downward by virtue of threads 88 in threaded bore 76. As the annular sleeve 90 moves downward the fluid volume V decreases and causes increase of the $K_c$ factor and, consequently, $f_H$. Rotation of ring gear 84 also rotates gear 104 and encoder 102 transmits an indication of positioning of annular sleeve 90 relative to reaction mass 16 to provide a continuous output. To repeat a frequency upsweep operation, the threaded sleeve assembly 80 would have to be retracted back upward to its maximum fluid volume V position (as shown in FIG. 1).

For a frequency downsweep, a reverse procedure would be used wherein the threaded sleeve assembly 80 was moved all the way inward to the smallest volume position for chamber 54, i.e. compares to the highest frequency, and the threaded sleeve assembly 80 would be synchronously moved upward during the downward frequency sweep of vibrator 10. To perform another down-sweep, the threaded sleeve assembly 80 would once again be moved to the minimum V position. Maximum V and minimum V positions are adjustable and can be preselected by inputs to the computer, i.e. control inputs 124–132 of FIG. 2.

In some seismic applications it may not be desirable to have continuous axial motion of the threaded sleeve 80 with respect to the reaction mass 16 during a sweep. In other words, fluid volume V may be adjusted to some predetermined maximum V and it would be maintained at that fixed value until a later adjustment became desirable. This type of operation may be preferred when a pseudorandom sweep such as a PARP signal (P-periodic A-amplitude R-random P-phase) is used to drive the vibrator. In this type of operation, the bandwidth of the vibrator is considered to be "quantum adjustable". Such quantum adjustments can be made under control of the microcomputer 122 and appropriate inputs; however, if quantum adjustable is the only desirable mode and such adjustments are infrequent, then the adjustments, including LVDT positioning, may all be done manually. In this event, the drive motor 94, encoder 102, interconnecting gears and microcomputer 122 would not be required and the threaded sleeve upper portion or ring gear 84 could be replaced by wrench flats and a suitable jamb nut or other thread-locking device to prevent unwanted rotation.

The foregoing discloses a novel seismic vibrator that is capable of adjusting bandwidth continually with changes in operating frequency. In particular, the device is desirable from the standpoint that a maximum bandwidth can be achieved for higher frequency seismic energy waves thereby to enable increased information content in the energy received for subsequent interpretive processing. It should also be understood that while the concept shown and described in the present application is configured for a land compression wave vibrator, the similar concept may be readily adapted or reoriented for use in a marine vibrator or a shear wave vibrator. Still further, the same concept may be used in large electrohydraulic shaker systems of the type that are widely used in dynamic testing of large structures.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for generating controlled vibrations, comprising:
    a frame means;
    piston means extending opposite first and second rod ends which are rigidly secured in said frame means;
    a reaction mass having a cylinder bore that is reciprocally disposed on said piston means;
    first sleeve means secured between said first rod end and said reaction mass cylinder bore;
    threaded adjustable sleeve means positioned between said second rod end and said reaction mass cylinder bore and being spaced from said first sleeve means to define a cylinder space therebetween;
    a ring gear affixed to rotate said adjustable sleeve means;
    motor means energizable to drive said ring gear and adjustable sleeve means in movement to vary the volume of said cylinder space;
    shaft encoder means driven by said ring gear to produce an output indication of adjustable sleeve means position relative to said piston means;
    hydraulic means alternating fluid pressure in said cylinder bore on opposite sides of said piston means; and
    control means responsive to said output indication of sleeve means position to effect hydraulic centering of said piston means relative to said cylinder bore.

2. Apparatus as set forth in claim 1 which further includes:
    baseplate means affixed to said frame means for earth-coupling of vibrations.

3. Apparatus as set forth in claim 1 wherein said frame means comprises:
    a first plate rigidly engaging said second rod end;
    a baseplate including earth-coupling surface rigidly engaging said first rod end; and
    housing means rigidly secured between said first plate and the baseplate.

4. Apparatus as set forth in claim 1 wherein said adjustable sleeve means comprises:
    an inner sleeve positioned adjacent said cylinder space; and an outer sleeve rigidly connected to said inner sleeve and being threadedly engaged in said reaction mass cylinder bore while extending an outer portion outward from the cylinder bore.

5. Apparatus as set forth in claim 1 which further includes:
a cylinder sleeve positioned within said cylinder bore and defining the circumfery thereof.

6. Apparatus as set forth in claim 1 which is further characterized to include:
a servovalve having first and second ports and being secured on said frame means;
first and second rod ports formed through said second rod end with respective rod ports being in fluid communication between said respective servovalve first and second ports and said cylinder space.

7. A seismic vibrator having variable bandwith capability comprising:
a frame for imparting vibratory energy;
a reaction mass having a cylinder bore with first and second ends and a central chamber;
piston means having first and second rod ends securely affixed to said frame and being reciprocally disposed in said cylinder bore;
first sleeve means sealing a first end of said cylinder bore;
adjustable sleeve means threadedly received and sealing the second end of said cylinder bore;
a ring gear affixed to rotate said adjustable sleeve means;
means for driving said adjustable sleeve means to vary the volume of said central chamber;
shaft encoder means driven by said ring gear to produce an output indication of adjustable sleeve means position relative to said piston means;
hydraulic drive means in fluid communication with said central chamber to impart reciprocal movement at preselected frequency between said reaction mass and the frame and piston means; and
control means controlling said means for driving and said hydraulic drive means and responsive to said output indication of sleeve means position to effect hydraulic centering of said piston means relative to said cylinder bore and to control said hydraulic drive means to impart said reciprocal movement.

8. A seismic vibrator as set forth in claim 7 which further includes:
an LVDT device secured to said frame and sensing an indication of the relative position of said reaction mass.

9. A seismic vibrator as set forth in claim 7 wherein:
said control means varies the volume of said central chamber in proportion to the variations in reciprocal movement frequency.

10. A seismic vibrator as set forth in claim 7 wherein:
said control means decreases the volume of said central chamber as the reciprocal movement frequency increases.

11. A seismic vibrator as set forth in claim 7 wherein:
said control means increases the volume of said central chamber as the reciprocal movement frequency decreases.

* * * * *